July 30, 1957  H. M. FIELD  2,800,750
ABRASIVE TOOL
Filed Sept. 9, 1955

INVENTOR.
Henry M. Field
BY
Wood, Herron & Evans
ATTORNEYS.

United States Patent Office 2,800,750
Patented July 30, 1957

2,800,750
ABRASIVE TOOL

Henry M. Field, Dayton, Ohio, assignor to Dayton Abrasive Products, Inc., Dayton, Ohio, a corporation of Ohio Application September 9, 1955, Serial No. 533,410

3 Claims. (Cl. 51—190)

This invention relates to a rotary tool which may be used for sanding, abrading, buffing, polishing and other operations by which metal, plastic and wood surfaces are finished. More particularly, this tool is of the type which is known in the art as an "expanding drum."

These expanding drums are usually fabricated from resilient rubber of medium hardness and are used to support a flexible cylindrical abrasive sleeve. In practice, the sleeve is slightly larger than the drum so that it may be easily slipped over it, after which the drum is compressed axially and expanded radially to provide a tight fit between the drum and sleeve.

The expanding drum is preferably fabricated from rubber, but may be fabricated from any other plastic material which provides the requisite flexibility, resiliency to deform under pressure, and yet to support the abrasive sleeve. The latter may be fabricated from paper, cloth, or plastic material and may carry any desired abrasive buffing or polishing material on its surface. For convenience herein the sleeve is designated an abrasive sleeve regardless of the exact texture of its outer surface.

In the past it has been conventional to accomplish the axial compression of the drum by means of a screw or nut which could be tightened with a hand tool. It is the object of the present invention to provide an arbor of the type specified, whereby the drum may be expanded by manipulation of the fingers without necessity for a hand tool. Other objects and further advantages will be disclosed in the accompanying drawing in which.

Figure 1:
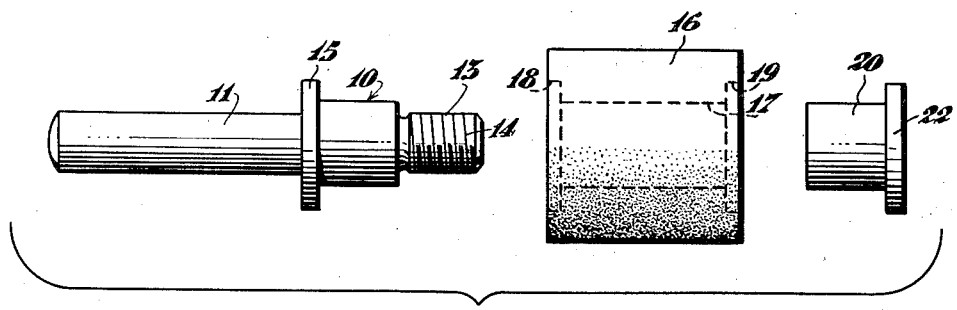
Figure 1 is an exploded view of the arbor, built without the abrasive sleeve.
Figure 2:
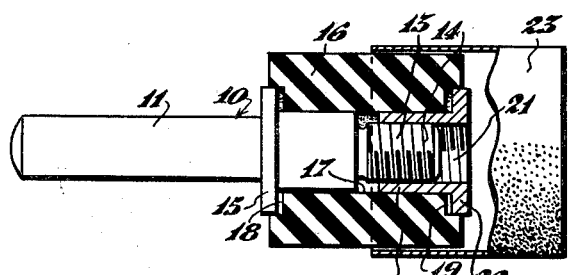
Figure 2 is a side elevation of the arbor, partly in section, showing the sleeve partially disposed over the drum.
Figure 3:
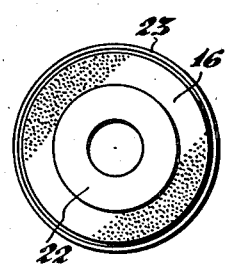
Figure 3 is an end view of the drum end of the arbor as disclosed in Figure 2.
Figure 4:
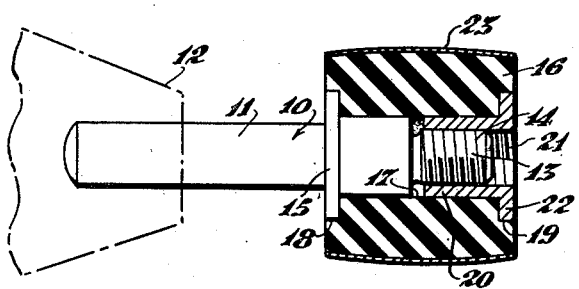
Figure 4 is a side elevation, partly in section, of the arbor with the drum expanded ready for use.
Figure 5:
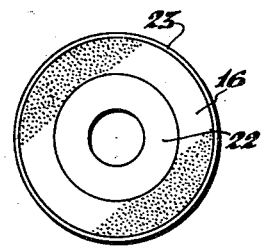
Figure 5 is an end view of the drum end of the arbor as disclosed in Figure 4.

As disclosed in the drawing, the arbor comprises a metal stem 10 having a shank 11, which may be mounted, for example, in a chuck 12. The opposite end of the arbor is provided with a stud 13 having male threads 14 and, spaced somewhat from the stud, a compression flange 15. A rubber drum 16 is provided with a central bore 17 and counterbores 18 and 19 at each end. The bore of the drum is of a diameter to just slip over the portion of the arbor between the stud and the compression flange, and the diameter of the stud is less than the bore of the drum. A compression sleeve 20 provided with internal screw threads 21 and an end flange 22 is utilized to apply compression to the rubber drum. The compression sleeve fits snugly within the bore of the drum and its threading mates with the threading on the stud so that rotation of the compression sleeve squeezes the drum between the flanged end of the sleeve and the flange on the stem. However, before the drum is expanded an abrasive or polishing sleeve 23 is slipped over the drum.

The drum is expanded merely by gripping the end of the abrasive sleeve 23 in the fingers and rotating it. The pressure is transmitted through the abrasive sleeve and through the rubber drum to the compression sleeve which is thus screwed down on the stud. No hand tool is required to perform this expanding and tightening operation for the simple reason that the abrasive sleeve provides such an excellent gripping surface that the operation can be readily performed by use of the fingers alone.

Having described my invention, I desire to be limited only by the following claims.

I claim:

1. An arbor for performing abrading and polishing operations, said arbor comprising a stem having a shank end adapted to be operatively connected to a rotating power shaft, a threaded stud projecting from the opposite end of said stem, a compression flange extending radially from the stem between the shank and stud, a compression sleeve having a radial compression flange at its outer end, said sleeve adapted to be screwed onto the stud, an expansible drum disposed over the stud end of the stem of the arbor and adapted to be compressed between the said compression flanges, and an abrasive sleeve disposed over said drum, the diameter of the sleeve and the bore of the drum being so related that radial pressure on the abrasive sleeve binds the drum to the compression sleeve, whereby the compression sleeve may be screwed onto the stud to compress the drum axially and expand it radially by pressure of the fingers without the use of a hand tool.

2. An arbor for performing abrading and polishing operations, said arbor comprising a stem, a rubber drum, a compression sleeve and an abrasive sleeve, said stem having a shank at one end thereof adapted to be operatively connected to a rotating power shaft, a cylindrical bore extending axially through said rubber drum, said bore being of a diameter to receive, in slip-fit relationship, said stem and said compression sleeve end to end, a circular compression flange at the end of said stem adjacent to said shank, a circular end flange which is substantially identical to the compression flange disposed at the outer end of said compression sleeve, a threaded stud extending axially from the end of the stem opposite to said shank, said stud being substantially smaller in diameter than the stem, the compression sleeve having an axial threaded bore therein to receive said threaded stud, whereby the rubber drum may be engaged upon the stem and the compression sleeve threaded onto the stud inside of said drum, the combined lengths of the stem and the compression sleeve being substantially less than the length of the drum whereby the compression sleeve may be tightened onto the stud to compress the drum between the respective flanges to expand the drum radially, the internal diameter of the abrasive sleeve being slightly greater than the outside diameter of the drum when the drum is in relaxed condition whereby the abrasive sleeve may be engaged over the drum and the compression sleeve then tightened onto the threaded stud to expand the drum radially by pressure of the fingers upon the abrasive sleeve, said pressure being transmitted through the drum to the compression sleeve to lock the abrasive sleeve upon the drum without the use of a hand tool.

3. An arbor as set forth in claim 2 in which the respective opposite ends of the drum are provided with counterbores to provide circular recesses into which the circular flange of the stem and the circular flange of the compression sleeve are received when the compression sleeve is tightened onto the threaded stud.

References Cited in the file of this patent

UNITED STATES PATENTS

| 574,763 | Rudolph | Jan. 5, 1867 |
| 1,208,501 | Crocker | Dec. 12, 1916 |